United States Patent Office 3,258,342
Patented June 28, 1966

3,258,342
PROCESS FOR AGING RICE ARTIFICIALLY
Floyd L. Normand, Harahan, La., assignor to the United States of America as represented by the Secretary of Agriculture
No Drawing. Filed Dec. 10, 1963, Ser. No. 329,590
1 Claim. (Cl. 99—80)

A nonexclusive, irrevocable, royalty-free license in the invention herein described, throughout the world for all purposes of the United States Government, with the power to grant sublicenses for such purposes, is hereby granted to the Government of the United States of America.

This invention relates to the special heat treatment of rice to accelerate aging.

More specifically it relates to a new and improved method of bringing about, by means of heat treatment in a sealed container, the desired characteristics that are obtained through aging of stored rice. The heat treated product in accordance with this invention is particularly characterized by its high organoleptic qualities as judged by a taste panel of five food tasters. The product absorbs less water during cooking, is less sticky when cooked, and loses less solids and nutrients to the cooking water than an untreated fresh rice sample. Solids losses during cooking are about one-fifth of those of the untreated fresh rice. The product when checked by the Hunter Color Difference Meter had about the same whiteness as an untreated sample. The product when tested by the Brabender Viscograph exhibited a higher peak viscosity and higher setback viscosity on cooling than an untreated sample; the product resembles untreated whole grain rice except that it is more opaque and is similar in properties as possessed by rice which has been stored at least ten months by conventional methods. Table I shows a comparative study of some of these properties in the process of investigation of the Bluebonnet 50 and the Nato varieties of rice.

Table I

BLUEBONNET 50 RICE

| Sample | Solids Loss Volume, ml. | Gel. Temp. °C. | Viscosity, BU | |
|---|---|---|---|---|
| | | | Peak | Cooled to 50° C. |
| Heated 2 hrs. at 110° C | 0.30 | 79.5 | 1,550 | 1,030 |
| Untreated Stored 10 mo | 1.25 | 76.5 | 1,390 | 930 |
| Untreated Fresh | 1.80 | 76.5 | 1,280 | 770 |

NATO RICE

| Heated 3 hrs. at 110° C | 0.75 | 76.5 | 1,800 | 1,000 |
| Untreated Stored 10 mo | 1.00 | 71.3 | 1,500 | 800 |
| Untreated Fresh | 2.30 | 72.0 | 1,350 | 710 |

NOTE.—BU is the abbreviation for Brabender Units; Gel. is the abbreviation for gelatinization.

In reference to the "Solids Loss Volume" column in Table I, the procedure employed in the determination of total solids loss was similar to that recommended by J. E. Simpson et al. on page 23 of "Quality Evaluation Studies of Foreign and Domestic Rices," where 2 grams of raw milled rice is mixed with 20 ml. distilled water in a large test tube, and is allowed to stand 30 minutes, then heated 30 minutes in a 90° C. water bath and drained. The treating water plus the rinse water are then made up to 30 ml. in a centrifuge tube, and centrifugation is done at 1800 r.p.m. for 5 minutes. The volume of the lower phase is recorded as "total solids loss," and is expressed in milliliters.

The object of this invention is to provide a new and improved process for improving the cooking and processing characteristics of freshly harvested rice.

Another object of this invention is to provide a new improved process for rendering freshly harvested rice immediately available for consumption and processing, thereby eliminating storage problems.

Rice is the most important food crop of the world. Rice supplies the major food requirements for more than one-half of the world's population. Rice comprises 70 to 80% of the food intake in many countries. However, a well-known fact in rice growing areas, freshly harvested rice is poor in cooking and processing quality as compared to aged rice. Unless fresh rice has been stored for several months—about six to ten months—it will cook to a pasty consistency, will loose more solids into the cooking water when cooked, and does not digest as easily as stored rice. The cooking and processing quality of rice improves during storage.

The physico-chemical changes taking place are not as yet recorded in the literature; nevertheless, there are several known methods that cause an improvement in that the storage time is considerably reduced. In South India freshly harvested paddy is kept in heaps of straw for several days to "cure it." A more controlled method originating from the Central Food Technological Research Institute at Mysore, India, involves the steam-heat treatment of freshly harvested paddy to improve its cooking and processing characteristics. These procedures involve either crude method, giving a nonuniform "cured" product, or a method which involves the addition and removal of moisture from the rice grain to bring about improvement. Also, these procedures are time consuming.

I have found if fresh rice is subjected to a particular sequence of steps of heat treatment the rice is improved in its culinary and food processing characteristics. The approach differs from known methods in that moisture is neither added nor removed at any phase of the treatment. The process of this invention takes only a few hours, which makes the common six to ten months of natural aging—a common practice—intolerably obsolete as a standard rice treating process.

The cost of processing rice by method of my invention is equal to or less than that of conventional storage. It is expected that cost gains will be observed by further investigation in the future.

The heat treated product requires the same amount of time for cooking as untreated rice; it is white in color; the grains are completely separate; the cohesiveness and texture of the product are superior to those exhibited by fresh rice and about the same as stored rice. With regard to separation of grains it is to be emphasized that my product exhibits a much better separation than fresh rice. The product in accordance with the invention presents two main advantages to the rice consumer and rice processor. The first is that the product cooks to a desired fluffy, dry, and well separated condition with minimum loss of nutrients to the cooking water, and the second is that immediate availability without time consuming storage (along with storage problems) of the rice, can be brought about.

The heat treatment technique required to bring about in freshly harvested rice, the cooking and processing characteristics observed in aged rice, involves heating the milled rice grains at their normal moisture content, about 12.5% to 13.0% in sealed containers by means of any suitable heating device.

Any of the known varieties of rice may be used in the practice of this invention, whether of the long or the medium grain type. The heating time and temperature necessary to bring about optimum improvement in rice quality should be between two and eight hours, and this timing is dependent upon the temperature, which should be between 90° and 110° C. The rice is then allowed to cool in the container to room temperature. It is desirable to heat the material in small sealed containers at rest, or in a larger container where the rice is in constant rotary motion to insure even distribution of heat. If the temperature is too low the time necessary to bring about the desired improvement is too long. Too high a heating temperature will produce unwanted fissuring and darkening in the grains.

The preferred procedure for heat treatment is to heat for two hours at 110° C. for Bluebonnet 50 long grain rice, and to heat for three hours at 110° C. for Nato medium-grain rice following the same procedure as described above. The new and improved process can be applied to either rough or milled rice. However, due to the insulating qualities of the surrounding rice, hull, better heat penetration was found for milled samples.

The following examples demonstrate the invention in greater detail.

EXAMPLE 1

Approximately 160 grams of freshly harvested 12.5% moisture content Bluebonnet 50 (long-grain) white rice was placed in a pint tin can, and sealed with a tight friction type lid. The can and contents were maintained at a temperature of 110° C. for a period of two hours without loss or gain in moisture content. The can and contents were then allowed to cool, and were held at room temperature for several hours to equilibrate.

Once the rice and contents had equilibrated, the can was opened and 60 grams introduced into 350 ml. of boiling water, and the contents were cooked until the disappearance of hard centers occurred. At this point the time was recorded and subsamples were given to a taste panel for appraisal. For fair comparative appraisal the heat treated sample was evaluated along with a sample of freshly harvested Bluebonnet 50 white rice from the same original batch and a sample of Bluebonnet 50 white rice which had been stored at ambient temperatures for 10 months.

The samples were rated on a basis of 5 as the perfect score, and decreasing numbers for decreasing comparative quality. The following results were obtained by averaging scores from 5 replications of the test.

*Results of taste panel test*

| Sample | Cohesiveness | Kernel Condition | Color | Flavor | Texture | | |
|---|---|---|---|---|---|---|---|
| | | | | | Firm | Tndr. | Dry |
| Rice of Ex. 1 | 4.6 | 4.8 | 5.0 | 5.0 | 4.4 | 4.6 | 4.0 |
| Fresh Rice | 3.8 | 5.0 | 4.8 | 5.0 | 4.2 | 5.0 | 3.4 |
| Rice Stored 10 mo | 4.2 | 5.0 | 5.0 | 5.0 | 4.2 | 5.0 | 3.6 |

EXAMPLE 2

Approximately 160 grams of freshly harvested 12.5% moisture content Nato (medium-grain) white rice was placed in a pint tin can, and sealed with a tight friction type lid. The can and contents were maintained at a temperature of 110° C. for a period of three hours without loss or grain in moisture content. The can and contents were then allowed to cool, and were held at room temperature several hours to equilibrate.

Once the rice and contents had equilibrated, the can was opened and 60 grams introduced into 350 ml. of boiling water, and the contents were cooked until the disappearance of hard centers occured. At this point the time was recorded and subsamples were given to a taste panel for appraisal. For fair comparative appraisal the heat treated sample was evaluated along with a sample of freshly harvested Nato white rice from the same original batch, and a sample of Nato white rice which had been stored at ambient temperatures for 10 months. These samples were scored in the same manner as those in Example 1. In averaging the scores from the five replacations of the text the following tabulated data were obtained.

*Results of taste panel test*

| Sample | Cohesiveness | Kernel Condition | Color | Flavor | Texture | | |
|---|---|---|---|---|---|---|---|
| | | | | | Firm | Tndr. | Dry |
| Rice of Ex. 2 | 4.6 | 3.8 | 4.2 | 5.0 | 4.4 | 4.6 | 3.8 |
| Fresh Rice | 3.0 | 4.6 | 4.8 | 4.8 | 3.2 | 4.2 | 1.8 |
| Rice Stored | 4.0 | 4.8 | 4.6 | 5.0 | 3.8 | 4.0 | 3.0 |

EXAMPLE 3

The procedure and methods of Example 1 were applied to a sample of Bluebonnet 50 rice but the can and contents were maintained at a temperature of 80° C. for a period of eight hours without loss or gain in moisture content. Appraisal of the cooked product by the Taste Panel indicated similar improvements over the freshly harvested rice as the improvements of the treated rice sample in Example 1, the only significant difference being the color value, which was rated 4.0 while that of the treated rice sample in Example 1 was rated 5.0.

EXAMPLE 4

The procedure and methods of Example 2 were applied to a sample of Nato rice but the can and contents were maintained at a temperature of 90° C. for a period of eight hours without loss or gain in moisture content. Appraisal of the cooked product by the Taste Panel indicated similar improvements over the freshly harvested rice as the improvements of the treated rice sample in Example 2. The taste panel values were basically the same as the treated rice values in Example 2.

I claim:

A process for artifically aging freshly harvested white rice to improve its subsequent cooking and processing qualities comprising heating freshly harvested white rice at its normal moisture content of about from 12.5% to 13.0% in a sealed, moisture-impermeable container at a temperature of about from 90° C. to 110° C. for about from 2 to 8 hours, the shorter time being employed with the higher temperature, without change in moisture content of said rice, cooling the heated container and its contents to room temperature, and holding the cooled container and its contents at room temperature until equilibrated.

References Cited by the Examiner

UNITED STATES PATENTS 766,212 8/1904 Anderson _____ 99—82
2,686,130 8/1954 Roberts _____ 99—80 X

OTHER REFERENCES

Desikacher et al., Journal of Scientific and Industrial Research Part A General, vol. 16A, 1957, article entitled, "The Curing of Freshly Harvested Paddy," Parts I and II, pp. 365–370.

Planck, R. W., Reprint from 1954 Rice Annual, article entitled, "Rice Research at the Southern Regional Research Laboratory," 4 pp., reprint being relied upon.

RAYMOND N. JONES, *Acting Primary Examiner.*